United States Patent [19]

Song

[11] Patent Number: 6,061,167
[45] Date of Patent: May 9, 2000

[54] OPTICAL ISOLATOR

[75] Inventor: Jin Young Song, Yongin, Rep. of Korea

[73] Assignee: Samsung Electronics Co., Ltd., Rep. of Korea

[21] Appl. No.: 09/297,888

[22] PCT Filed: Nov. 29, 1997

[86] PCT No.: PCT/KR97/00248

§ 371 Date: May 11, 1999

§ 102(e) Date: May 11, 1999

[87] PCT Pub. No.: WO98/23983

PCT Pub. Date: Jun. 4, 1998

[30] Foreign Application Priority Data

Nov. 30, 1996 [KR] Rep. of Korea ............... 96-60708

[51] Int. Cl.[7] .............. G02F 1/03; G02F 1/295; G02B 5/30; G02B 6/00

[52] U.S. Cl. ............. 359/256; 359/484; 385/8; 385/11

[58] Field of Search .................. 385/8, 11, 34; 359/238, 239, 245, 256, 281, 282, 483, 485, 494, 497

[56] References Cited

U.S. PATENT DOCUMENTS 4,548,478  10/1985  Shirasaki ................. 359/256

FOREIGN PATENT DOCUMENTS

WO 96/12986  5/1996  WIPO .

*Primary Examiner*—Scott J. Sugarman
*Assistant Examiner*—David N. Spector
*Attorney, Agent, or Firm*—Burns, Doane, Swecker & Mathis L.L.P.

[57] ABSTRACT

An optical isolator capable of simultaneously transmitting a plurality of light beams emitted from a plurality of optical fibers in one direction. It includes a plurality of optical fibers for transmitting light beams; a pair of collimating lenses for converting the light beams, emitted from or entered into the optical fibers, into parallel light beams; a pair of symmetric birefringent elements having at least one tapered surface for emitting by polarization the plurality of parallel light beams having passed the collimating lenses, and condensing all the light beams traveling in a forward direction onto the optical fibers, respectively; and a Faraday rotator interposed between the birefringent elements for rotating the light beams incident thereto by 45 degrees. A plurality of tapered faces having the same tapered angle are formed on one surface of the birefringent element so that a plurality of light beams can be simultaneously transmitted in one direction.

5 Claims, 2 Drawing Sheets

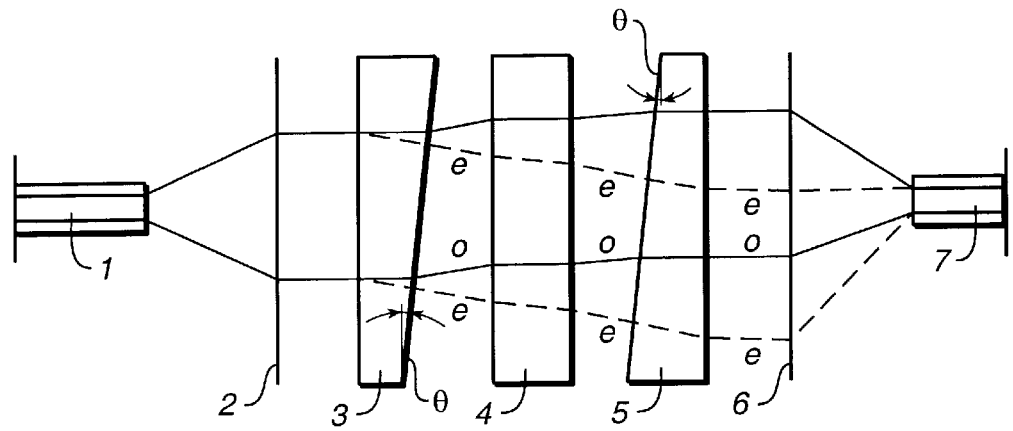
FIG._1 (PRIOR ART)
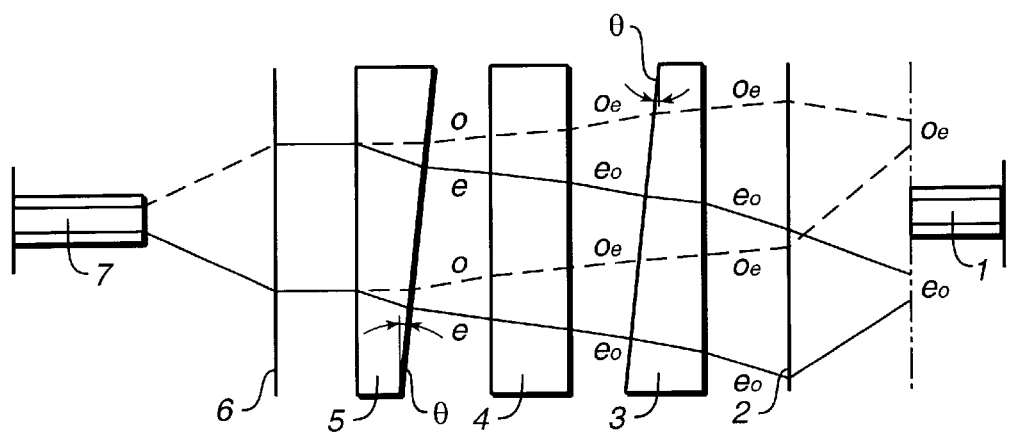
FIG._2 (PRIOR ART)

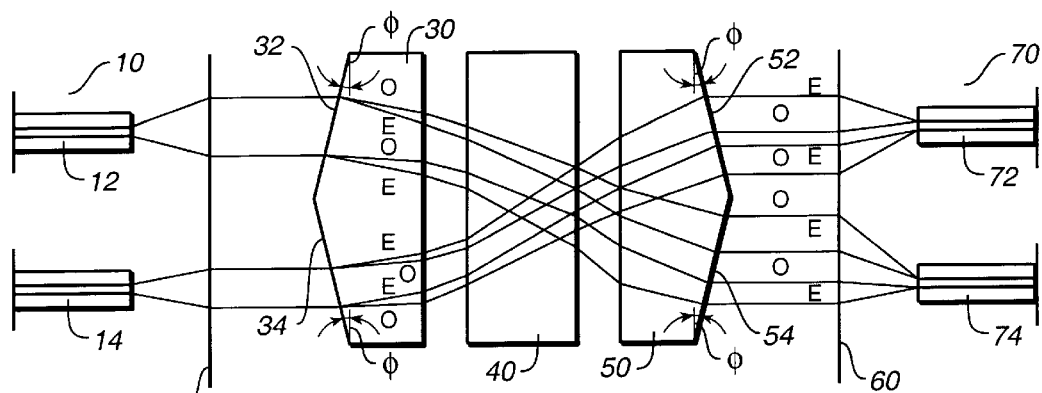
FIG._3
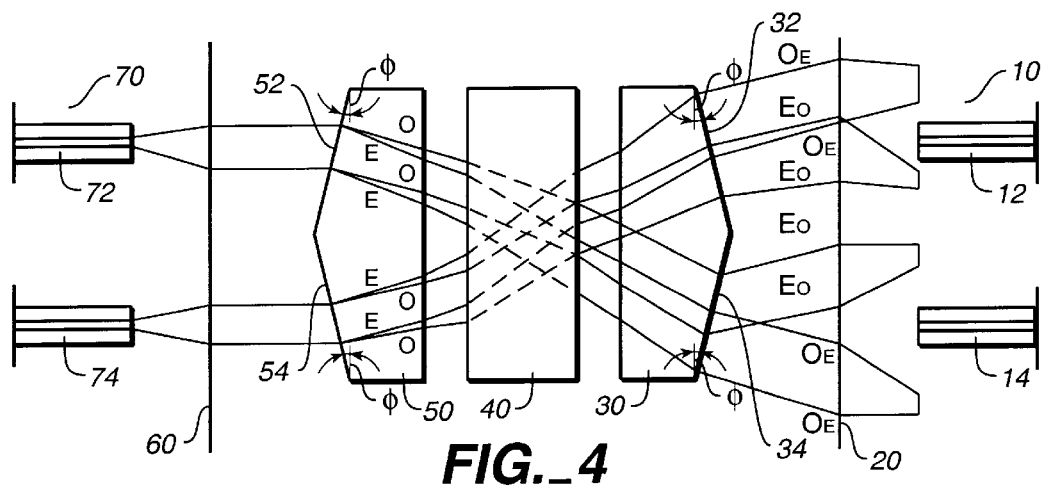
FIG._4
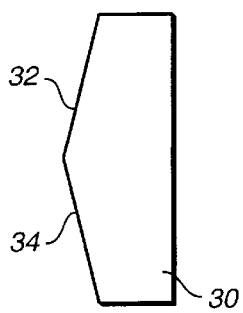
FIG._5A
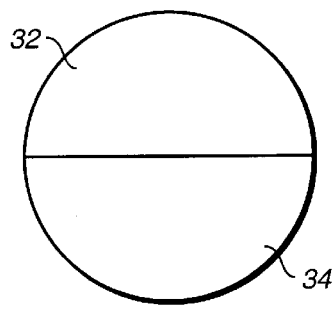
FIG._5B
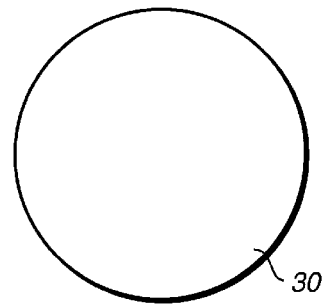
FIG._5C

OPTICAL ISOLATOR

BACKGROUND OF THE INVENTION

1. Field of the Invention

The present invention relates generally to an optical transmission system for transmitting prescribed information utilizing light. In particular, the present invention relates to an optical isolator which transmits light in one direction without loss, but intercepts the light transmission in the opposite direction.

2. Description of the Prior Art

Nowadays, as the social activities become diverse and complicated, the amount of information communicated by human-to-human, human-to-computer, computer-to-machine, etc., has been gradually increased.

Accordingly, various techniques for transmitting the diverse and large-scaled information accurately, rapidly, and distantly have been steadily developed. As one among such developed techniques, an optical transmission system has been commercialized, and this brings the necessity for optical devices having more diverse functions.

One of such optical devices for use in the optical transmission system is an optical isolator. To protect a light source, for instance, such as laser diodes, the optical isolator passes the light in a forward direction, but intercept the light transmitted in a backward direction.

FIGS. 1 and 2 illustrate the structure of a conventional optical isolator which is disclosed in U.S. Pat. No. 4,548,478.

This conventional optical isolator includes a Faraday rotator 4 for rotating by 45° the light incident through an optical path between first and second optical fibers 1 and 7, and first and second birefringent elements 3 and 5 placed in front and rear of the Faraday rotator 4, respectively.

Each of the first and second birefringent elements 3 and 5 has a tapered surface with a predetermined tapered angle θ, and the optical axes thereof cross each other with an angle of 45°.

The optical isolator also includes first and second collimating lenses 2 and 6 for converting the light emitted from the first and second optical fibers 1 and 7 into parallel light beams.

According to the conventional optical isolator, as shown in FIG. 1, in the event that the light travels in a forward direction, i.e., from the first birefringent element 3 to the second birefringent element 5, the light emitted from the first optical fiber 1 is converted into parallel light beams, by passing through the first collimating lens 2.

The parallel light beams transmitted from the first collimating lens 2 is entered into the first birefringent element 3, and then divided into ordinary rays o and extraordinary rays e. These ordinary and extraordinary rays o and e are rotated by 45° by the Faraday rotator 4.

Thereafter, the ordinary and extraordinary rays o and e, which have been rotated by 45°, pass through the second birefringent element 5 to be refracted and converted into parallel light beams. This parallel light beams are condensed through the second collimating lens 6, and then entered into the second optical fiber 7.

Meanwhile, as shown in FIG. 2, in the event that the light travels in a backward direction, i.e., from the second birefringent element 5 to the first birefringent element 3, the parallel light beams transmitted from the second collimating lens 6 are entered into the second birefringent element 5, and then divided into the ordinary rays o and the extraordinary rays e. These ordinary and extraordinary rays o and e are rotated clockwise by the Faraday rotator 4.

At this time, since the optical axes of the first and second birefringent elements 3 and 5 cross each other, the direction of the ordinary rays o make a right angle with that of the extraordinary rays e, and this causes the ordinary and the extraordinary rays o and e incident to the first birefringent element 3 to be reversed from each other.

Accordingly, the reversed light rays $o_e$ and $e_o$ having passed through the first birefringent element 3 cannot become parallel beams, but respectively pass through the first collimating lens 2 with angles predetermined in accordance with the tapered angle θ of the first and second birefringent elements 3 and 5. Accordingly, the reversed light rays travel in left and right directions, or upper and lower directions of the first optical fiber 1, and thus cannot be entered into the core of the first optical fiber 1.

As a result, if the light travels in the backward direction of the optical isolator, a great loss of light is produced, and thus the light transmission is intercepted.

However, according to the conventional optical isolator, since the first and second birefringent elements 3 and 5 have only one tapered surface, only one optical signal can be propagated through the optical fibers 1 and 7, resulting in that only one optical signal can be transmitted by one optical isolator.

Accordingly, in the wavelength division multiplexing communication fields utilizing a plurality of optical signals, a plurality of optical isolators should be employed to simultaneously transmit the optical signals, and this causes the size of the optical system and the manufacturing cost thereof to be increased.

SUMMARY OF THE INVENTION

It is an object of the present invention to provide an optical isolator which can transmit a plurality of light beams emitted from a plurality of optical fibers in one direction.

In order to achieve the above object, there is provided an optical isolator comprising:

a plurality of optical fibers for transmitting light beams;

a pair of collimating lenses for converting the light beams emitted from or entered into the optical fibers into parallel light beams;

a pair of symmetric birefringent elements, having at least one tapered surface, for emitting by polarization the plurality of parallel light beams having passed the collimating lenses and condensing all the light beams traveling in a forward direction onto the optical fibers, respectively; and a Faraday rotator, interposed between the birefringent elements, for rotating the light beams incident thereto by 45°.

BRIEF DESCRIPTION OF THE DRAWINGS

The above object, other features, and advantages of the present invention will become more apparent by describing the preferred embodiment thereof with reference to the accompanying drawings, in which:

FIG. 1 is a schematic view illustrating the optical path of a conventional optical isolator in case that the light travels in a forward direction.

FIG. 2 is a schematic view illustrating the optical path of a conventional optical isolator in case that the light travels in a backward direction.

FIG. 3 is a schematic view illustrating the optical path of the optical isolator according to the present invention in case that the light travels in a forward direction.

FIG. 4 is a schematic view illustrating the optical path of the optical isolator according to the present invention in case that the light travels in a backward direction.

FIGS. 5A to 5C are front, left side, and right side views of the double refracting element of FIG. 3, respectively.

DETAILED DESCRIPTION OF THE PREFERRED EMBODIMENT

The preferred embodiment of the present invention will be explained in detail with reference to FIGS. 3, 4, 5A to 5C.

FIGS. 3 and 4 show the structure of the optical isolator according to the present invention. In detail, FIG. 3 is a schematic view illustrating the optical path of the optical isolator in case that the light travels in a forward direction, and FIG. 4 is a schematic view illustrating the optical path of the optical isolator in case that the light travels in a backward direction.

In the present invention, description of the same structure as the conventional optical isolator as described above will be omitted.

Referring to FIGS. 3 and 4, the present invention is directed to a so-called multi-isolator which transmits optical signals emitted from a plurality of optical fibers 12 and 14 provided at one side of the isolator to a plurality of optical fibers 72 and 74 provided at the other side of the isolator without loss, but intercepts the transmission of the optical signals in the opposite direction.

A Faraday rotator 40 is interposed between first and second birefringent elements 30 and 50.

Each of the first and second birefringent elements 30 and 50, as shown in FIGS. 5A to 5C, has a pair of tapered faces 32 and 34, or 52 and 54 which are symmetrically formed on one surface thereof based on a horizontal dividing line and which have a predetermined tapered angle $\phi$.

Especially, the first and second birefringent elements 30 and 50 are so arranged that the tapered faces 32, 34, 52, and 54 thereof face the first and second collimating lenses 20 and 60, respectively.

Also, the crystal axis of the first or second collimating lens 20 or 60 has an angle of 45° clockwise or counter clockwise.

The operation of the optical isolator including the first and second birefringent elements 30 and 50 according to the present invention will now be explained.

First, in the event that light beams propagate in the forward direction as shown in FIG. 3, the light beams emitted from the optical fibers 12 and 14 are converted into parallel light beams by passing through the first collimating lens 20, and the parallel light beams are entered onto the tapered faces 32 and 34 of the first birefringent element 30 which have the same tapered angle $\phi$.

The parallel light beams incident to the first birefringent element 30 are divided into ordinary rays O and extraordinary rays E by polarization. The polarized ordinary and extraordinary rays are entered into the Faraday rotator 40 to be rotated clockwise or counterclockwise in accordance with the magnetic polarity of the Faraday rotator 40.

The ordinary rays O and the extraordinary rays E are entered into the second birefringent element 50, and refracted from the tapered faces 52 and 54 to be converted into parallel light beams. These parallel light beams are kept as the ordinary rays O and the extraordinary rays E through the second collimating lens 60, and then condensed into the optical fibers 72 and 74 as they are.

In other words, the second birefringent element 50 has been rotated by 45° in the same direction as the rotating direction of light relative to the first birefringent element 30).

Accordingly, the ordinary rays O pass through the first and second birefringent elements 30 and 50, and then are outputted as they stand, while the extraordinary rays E pass through the first and second birefringent elements 30 and 50, and then are outputted as they stand.

On the contrary, in the event that light beams propagate in the backward direction as shown in FIG. 4, the light beams emitted from the optical fibers 72 and 74 are converted into parallel light beams by the second collimating lens 60, and then the parallel light beams are entered into the tapered faces 52 and 54 of the second birefringent element 50 which have the same tapered angle $\phi$.

The parallel light beams are polarized and divided into ordinary rays O and extraordinary rays E through the second birefringent element 50, and then the polarized ordinary and extraordinary rays are rotated by 45° in the direction opposite to the rotating direction of the Faraday rotator 40.

The ordinary rays O and the extraordinary rays E from the Faraday rotator 40, however, cannot be converted into parallel light beams from the tapered faces 32 and 34 of the first birefringent element 30, but emanate from the tapered faces 32 and 34 as divergent light rays.

Specifically, the ordinary rays O become the extraordinary rays $E_o$ and the extraordinary rays E become the ordinary rays $O_e$, so that they are condensed into left and right sides, or upper and lower sides of the optical fibers 12 and 14 after passing through the first collimating lens 20.

As a result, if the light beams propagate in the backward direction, they cannot be entered into the cores of the optical fibers 12 and 14.

As described above, according to the present invention, since a plurality of optical or wavelength signals can be simultaneously transmitted in one direction using birefringent elements having a plurality of tapered faces of the same tapered angle, the manufacturing cost of the optical system can be reduced and a miniaturized optical isolator can be realized.

While the present invention has been described and illustrated herein with reference to the preferred embodiment thereof, it will be understood by those skilled in the art that various changes in form and details may be made therein without departing from the spirit and scope of the invention.

What is claimed is:

1. An optical isolator comprising:
   a plurality of optical fibers for transmitting light beams;
   a pair of collimating lenses for converting said light beams emitted from or entered into said optical fibers into parallel light beams;
   a pair of symmetric birefringent elements, having at least one tapered surface, for emitting by polarization said plurality of parallel light beams having passed said collimating lenses, and condensing all said light beams traveling in a forward direction onto said optical fibers, respectively; and
   a Faraday rotator, interposed between said birefringent elements, for rotating said light beams incident thereto by 45°.

2. An optical isolator as claimed in claim 1, wherein each of said birefringent elements has a plurality of tapered faces which have a plurality of tapered angles, respectively, and which are formed on one surface of said birefringent element.

3. An optical isolator as claimed in claim 2, wherein said tapered faces of said birefringent elements have the same tapered angle.

4. An optical isolator as claimed in claim 2, wherein said tapered faces of said birefringent elements are arranged to face said pair of collimating lenses, respectively.

5. An optical isolator as claimed in claim 1, wherein each of said birefringent elements has a crystal axis having an angle of 45° clockwise or counterclockwise.

\* \* \* \* \*